United States Patent [19]

Bellhouse et al.

[11] Patent Number: 4,906,845
[45] Date of Patent: Mar. 6, 1990

[54] OPTICAL SENSOR FOR DETECTING LIQUID MEDIUM

[75] Inventors: Brian J. Bellhouse, Islip; Stephen Goodman, Swindon, both of England

[73] Assignee: Bellhouse Technology Limited, Abingdon, England

[21] Appl. No.: 285,968

[22] PCT Filed: Jun. 17, 1987

[86] PCT No.: PCT/GB87/00423

§ 371 Date: Dec. 7, 1988

§ 102(e) Date: Dec. 7, 1988

[87] PCT Pub. No.: WO87/07946

PCT Pub. Date: Dec. 30, 1987

[30] Foreign Application Priority Data

Jun. 17, 1986 [GB] United Kingdom ............... 8614741

[51] Int. Cl.⁴ .................................................. H01J 5/16
[52] U.S. Cl. ............................... 250/227.28; 250/577; 250/227.31
[58] Field of Search .............. 250/227, 577; 604/260; 128/DIG. 13

[56] References Cited

U.S. PATENT DOCUMENTS

| 4,039,845 | 8/1977 | Oberhänsli et al. | 250/577 |
| 4,468,567 | 8/1984 | Sasano et al. | 250/577 |
| 4,713,552 | 12/1987 | Denis et al. | 250/577 |
| 4,792,699 | 12/1988 | Duncan | 250/227 |
| 4,816,670 | 3/1989 | Kitamura | 250/227 |

Primary Examiner—David C. Nelms
Assistant Examiner—Khaled Shami
Attorney, Agent, or Firm—Jeffers, Hoffman & Niewyk

[57] ABSTRACT

An optical sensor comprises a probe (10) and an annular optical element (13) coupled optically to a pair of optical fibres (18). Light transmitted down one fibre is reflected around the element (13) and back up the other fibre to a photodetector. The level of light received by the photodetector is dependent upon the amount of light lost from the element (13) as a result of characteristics of the surrounding medium. The presence or absence of a surrounding liquid medium may thus be sensed and a motor (34) operated to suck liquid up through the probe, when the liquid is present.

29 Claims, 3 Drawing Sheets

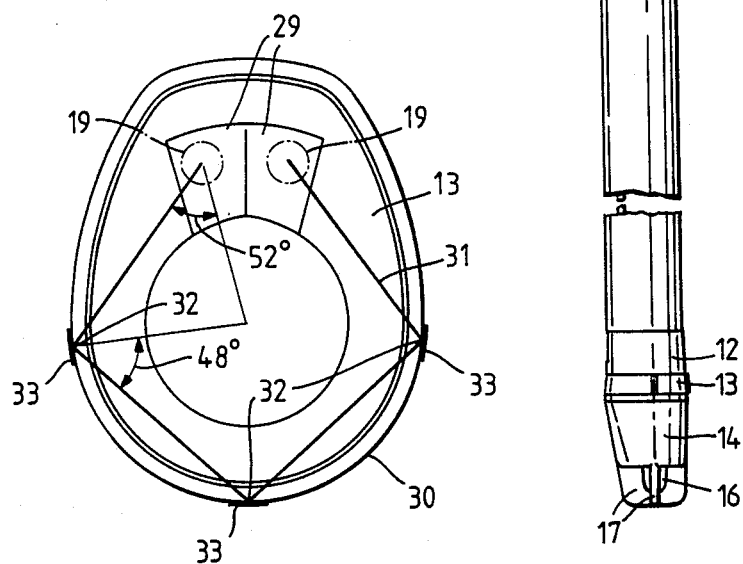

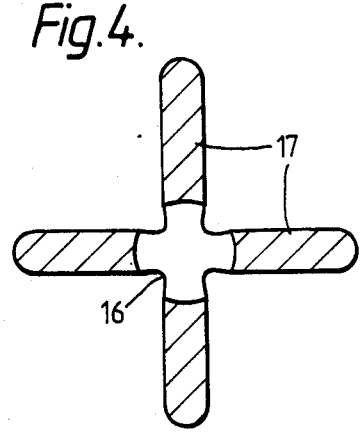
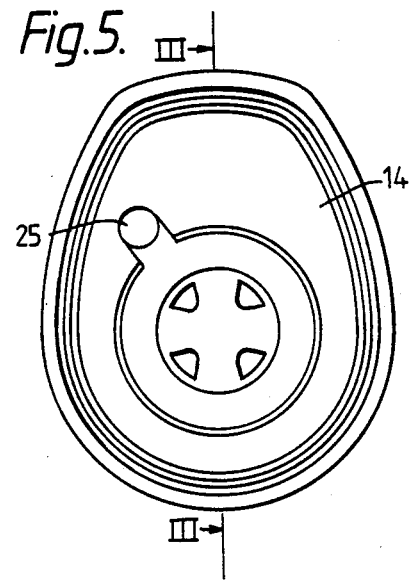
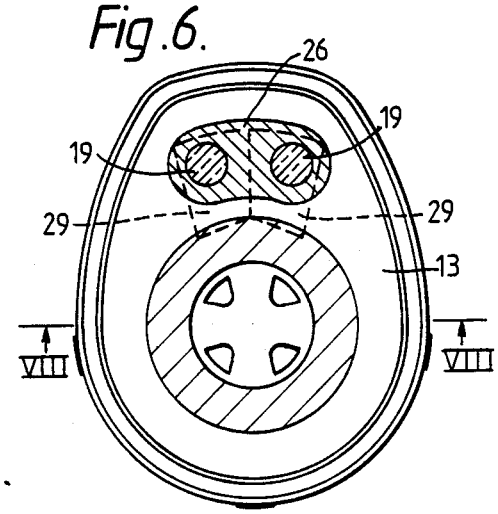
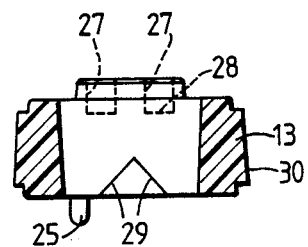
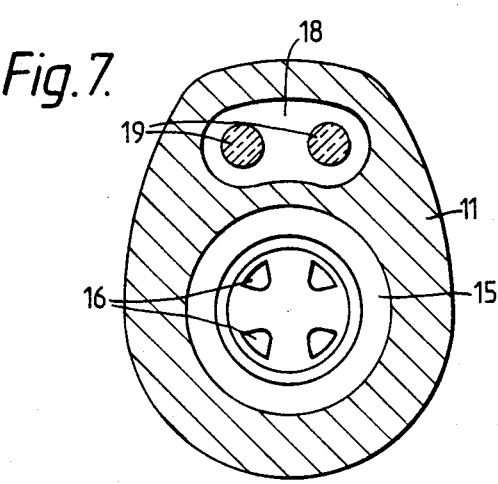

OPTICAL SENSOR FOR DETECTING LIQUID MEDIUM

Sensors incorporating light guides have been proposed in applications where information may be obtained optically from a remote position. In general, light from a source is transmitted by total internal reflection along a light guide to a position from where information is required, ad light modulated in some way to carry the information is transmitted back along the same or another light guide to a photodetector. One kind of sensor is used as an optical dip-stick. It consists of a glass or plastics rod which has a bevelled tip, or of a bevelled tip, such as a prism, at the end(s) of one of more light guides. Light transmitted down one side of the rod, or down a light guide, is reflected twice at the bevelled tip and returns up the other side of the rod, or up the other light guide, when the tip is dry. When the tip is wet and the angle of incidence is less than the critical angle, light is lost and the returning optical signal is greatly reduced. A variant of this sensor consists of a sinuous flexible optical fibre along which light is transmitted to and from an end of the sensor, light being lost from the curved portions of the optical fibre when the fibre is wetted.

Such sensors have been used in conjunction with liquid level control systems, whereby, for example, a pump relay is operated in dependence upon whether the intensity of light received by the photodetector is above or below a predetermined threshold.

The known sensors suffer from a number of problems, such as the difficulty of manufacturing the sensors with an accurately reproducible response at a precise sensing location, the need for repeated recalibration owing to fouling of the surface of the light guide by deposits or contact with foreign matter, drop retention at the sensing location leading to light loss when the sensor is otherwise dry, excessive sensitivity in that there is almost complete light loss when only a small part of the sensing location is wetted, and complete light loss when the sensing region is wetted so that the wetted state is indistinguishable from a break in the light guide.

In accordance with the present invention, an optical sensor comprises an elongate probe; a light guide extending from a light source, along the probe towards a tip of the probe and back along the probe to a photodetector, the light guide including, adjacent to the tip, a rigid element, which has a radially outer substantially cylindrical surface providing substantially total internal reflection of light passing circumferentially around the probe within the element or loss of light depending on the optical properties of a surrounding medium, and which is mounted in a substantially cylindrical portion of the probe so that the outer surface of the element is substantially flush with the outer surface of that portion of the probe.

Preferably the element is substantially annular and is closely received in a groove in the probe.

The use at the sensing location of the rigid element, the light transmitting and reflecting surfaces of which will be optically smooth, with the element recessed into the probe with only its radially outer surface exposed, overcomes many of the disadvantages of previous sensors. The element, which will normally be a plastics moulding, will be preformed with the necessary precision and with the appropriate geometry for the particular application. Droplet retention may be discouraged by coating the adjacent part of the outer surface of the probe with a hydrophobic material, such as polyurethane or silicone.

Simple assembly may be provided by mounting the element between two parts of the probe which are connected by a spigot and socket coupling, the element surrounding the spigot. Light may then be transmitted into and out of the element by optical fibres, which preferably extend down the probe, protected in their own duct or ducts in the probe, with ends of the optical fibres abutting optical coupling surfaces of the element facing axially away from the probe tip. The surface of the element facing the probe tip may then be provided with indented chamfered reflection surfaces in alignment with the coupling surfaces to reflect light from one optical fibre, circumferentially around the element and, to reflect light passing circumferentially around the element into the other optical fibre. The optical coupling surfaces may be provided by the end walls of blind sockets, which are formed in the element and which receive the ends of the optical fibres. If the optical fibres and coupling surfaces are closely angularly spaced, the light may be transmitted circumferentially around within the element through an angle of the order of 300° or more.

In use light will be transmitted around within the element with potential total internal reflection at nodes on the radially outer surface of the element. The geometry may be such that an integral number of theoretical reflection nodes will exist around the radially outer surface which is exposed to the surrounding medium. One can hypothesise that the light loss at each node when it is wetted or otherwise contacted with an appropriate medium would be a fraction, e.g. 50%, of the light incident at that node. Light loss at a single node, resulting for example from some perturbation in the surrounding medium, will not then reduce the transmitted light by more than 50%. However, if the surrounding medium is such that light is lost from the element at all the nodes, of which there may be between three and six, the remaining light which is transmitted out of the element will approach zero intensity, but still be finite. Appropriate thresholds can then be set to determine whether the light loss corresponds to a significant change in the surrounding medium, and still distinguish from the case in which all light is lost owing to a break in the light guide.

However this hypothesis depends on the light rays being effectively collimated, which they will not normally be. In practice they are divergent when entering the element so that only the central rays will be reflected at the nodes, the remaining rays being reflected at other than the nodes and, becoming more diffuse, and possibly even being reflected at the radially inner surface of the element. We have found that an excellent response, i.e. not too great a sensitivity, can be obtained by ignoring the central rays and effectively using the diffuse light. This can be achieved by providing areas of reflectivity on the radially outer surface of the element at the nodes so that the central rays are always internally reflected at these positions, irrespective of the surrounding medium. It will then be the loss of the diffuse light internally incident on the radially outer surface of the element between the areas of reflectivity, in dependence on the wetness or other relevent optical characteristics of the surrounding medium, which will determine the intensity of light transmitted along the light guide out of the element. Because there is negligible loss of light from the central rays, this intensity will always be finite and appropriate thresholds can be set to determine whether the light loss corresponds to a significant change in the surrounding medium, and still distinguish from the case in which all light is lost owing to a break in the light guide. The areas of reflectivity may extend, in aggregate, around about one third of that part of the circumference of the element about which the light is transmitted. For some reason this arrangement seems not to be ultrasensitive to contact with wet tissue.

The sensor has a wide variety of applications but in most cases, the detector will be a photoelectric transducer, such as a photodiode, which may be connected into a suitable electronic circuit to produce an electrical signal corresponding to the intensity of the optical signal detected. The electrical signal may be fed to a display, or to recording apparatus, or as a control signal to a pump, valve or motor associated with the liquid or medium being sensed, usually via a discrimination circuit which responds to whether the signal level is above or below a certain threshold. To avoid spurious response to transient ambient light, the light transmitted along the light guide is preferably pulsed, the circuit connected to the photodetector being responsive only to the pulse frequency.

A typical use for the sensor in a non medical field is as a level sensor, bubble detector, colour sensor or interface detector in mixtures of gas, liquid and/or solid.

Two very important uses for these sensors in reservoirs for blood or liquids for infusion, and (b 2) in association with a liquid sucker, such as catheter for removal of blood or other body fluids in vascular and cardiac surgery, or a dentist's mouth piece for removing saliva from a patient's mouth. Conventionally, such suckers operate continuously and if they are to have sufficient capacity to remove all liquid as it accumulates, it is inevitable that they will continually aspirate air and liquid This is irritatingly noisy and, if the liquid is blood, the resulting shear stresses in the blood are a major cause of blood trauma and the formation of gas microbubbles and fat globules. These problems can be overcome if the liquid sucker has a tubular body providing the probe of a sensor in accordance with the present invention. The signal received by the detector may then be used automatically to switch on a pump or other source of suction to the sucker when the radially outer surface of the element is wetted by the liquid, and to switch off the source of suction when the liquid level has dropped below the element By appropriately positioning the suction tube relatively to a body cavity, a constant level of fluid may be maintained, for example in the pericardium during topical hypothermic myocardial protection.

By using light of a particular wavelength, information about the state of liquid adjacent to the element may be obtained For example, if the light transmitted along the light guide is red, conveniently supplied by a red light emitting diode, and the liquid is blood, the loss of light from the element and hence the optical signal received by the detector, varies with the colour of the blood. The variation in the colour is correlated with the oxygen saturation of the blood. Such a sensor may provide a valuable clincial guide to the performance of an artificial lung during open heart surgery.

A further application of the sensor is for sensing the pH of blood or other liquid, where the outer surface of the element is coated with immobilised material which changes colour with the pH of the medium with which it is in contact. The change in colour of the immobilised material will produce a corresponding change in the level of the detected signal. Similarly the outer surface of the element may be coated with a material, such as an antibody, which reacts with the surrounding medium thereby changing the thickness of the coating and hence the light loss through the coating.

An example of a liquid sucker, constructed in accordance with the present invention, is illustrated in the accompanying drawings, in which:

FIG. 1 is a partially diagrammatic side elevation of the sucker;

FIG. 4 is a section taken on line IV—IV in FIG. 3;

FIG. 5 is a section taken on the line V—V in FIG. 3;

FIG. 6 is a section taken on the line VI—VI in FIG. 3;

FIG. 7 is a section taken on the line VII—VII in FIG. 3;

FIG. 8 is a section taken on the line VIII—VIII in FIG. 6 of an optical element of the sucker; and, FIG. 9 is a plan view of the optical element showing its manner of operation.

Figure 2:
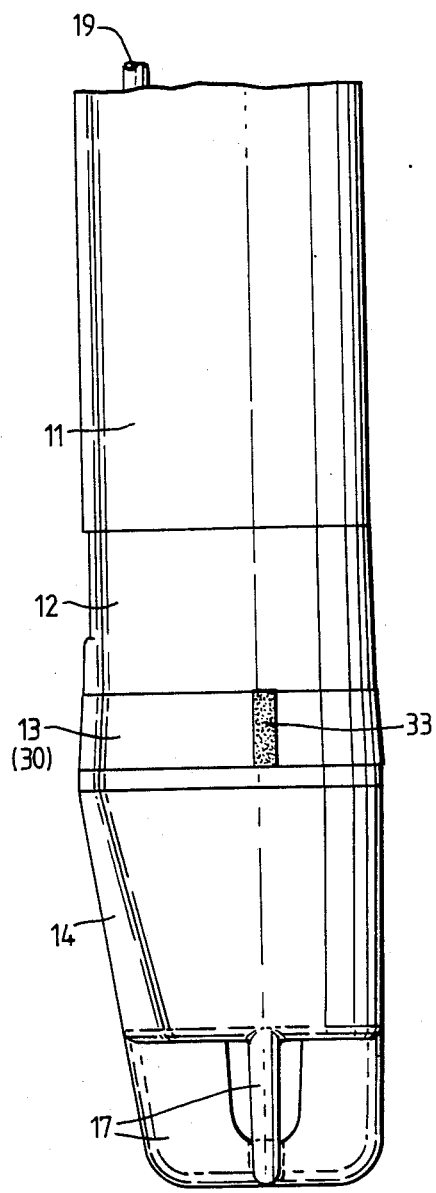
FIG. 2 is an enlarged side elevation of the end of the sucker.
Figure 3:
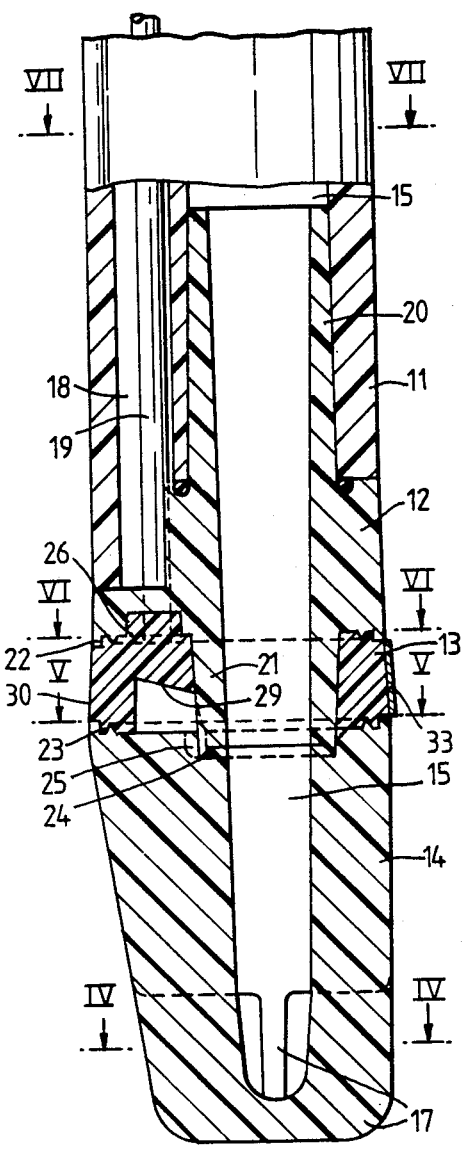
FIG. 3 is a vertical section through the end of the sucker taken on the line III—III in FIG. 5.

The sucker is formed by an elongate probe 10 formed of a substantially rigid bilumina plastics tube 11, to the end of which is fitted a head comprising a plastics connector element 12, an optical element 13, and a plastics tip element 14. The peripheral, substantially cylindrical, surfaces of the elements 12 and 13, and of the elements 13 and 14, are flush with one another. A central suction lumen 15 of the tube 11 continues through the elements 12, 13 and 14 and opens through four inlets 16 between cruciform vanes 17 at the end of the tip element 14. The tube 11 also has at one side a second smaller lumen 18 providing protection for a pair of optical fibres 19.

The connector element 12 has a spigot 20 which is a tight fit in a lower end of the lumen 15 to couple the tube to the element 12. The element 12 also has at its other end a second spigot 21 which passes closely through a central aperture in the optical element 13 and into a socket in the upper end of the tip element 14 coaxial with the continuation of the lumen 15. The element 13 is therefore effectively mounted in an annular groove around the spigot 21. The three elements are securely fixed together by ultrasonic welding at mutually contacting lips 22, 23 and 24. Proper mutual angular orientation between the elements 12 and 13 is provided by a projection 25, which depends eccentrically from the element 13 and is received in a complementary recess in the upper face of the element 14. In this mutual angular orientation, a raised boss 26 positioned eccentrically on the upper face of the optical element 13 is in alignment with the secondary lumen 18 in the tube 11. As shown in FIG. 6 and 9, the boss 26 is provided with two blind sockets 27 each of which receives as a close fit the lower end of a respective one of the two optical fibres 19. End walls 28 of the sockets provide optical coupling surfaces which are abutted by the ends of the optical fibres so that light may be transmitted between the optical element 13 and the fibres. Immediately opposite the sockets 27, the optical element 13 is provided on its under surface with a V-shaped recess forming indented chamfered reflection surfaces 29.

The optical element 13 is made of hard optical quality translucent acrylic material and its optical surfaces, namely the end walls 28 of the sockets, its peripheral wall 30 and the reflection surfaces 29 are optically polished. The arrangement is such that when light is transmitted down one of the optical fibres 19, it passes through the end wall 28 of its respective socket into the element 13, and is incident on the respective reflection surface 29 in a direction substantially parallel to the length of the probe. The light is reflected off the surface 29 and passes around the element 13, as a result of total internal reflection at the peripheral wall 30. As shown in FIG. 9, the geometry is arranged so that the central rays 31 will be reflected at three nodes 32 before being incident on the other reflection surface 29, and hence being reflected back into, and transmitted along the other optical fibre 19. Narrow axially extending reflective strips 33 are printed on to the peripheral surface 30 at positions corresponding to the nodes 32. As explained above, this is to ensure total internal reflection of the central rays at all time. The diffuse rays which impinge on the surface 30 between the nodes 32 will be total internally reflected to an extent depending upon the medium surrounding and in contact with the walls 30. This will affect the level of light transmitted back along the second optical fibre 19 and, as explained, is a measure of a characteristic of the surrounding medium.

The simple sucker illustrated is primarily intended to distinguish between the presence or absence at the lower end of the probe of a liquid which is to be sucked through the lumen 15 by a pump 4. As suggested in FIG. 1, the optical fibres 19 may be connected to a control box 35, containing a light source, such as an LED, which transmits light down the first optical fibre 19, and a photodetector, which receives light transmitted back through the other optical fibre 19. The control unit 35 will be programmed to recognise whether the received light exceeds a predetermined threshold level, indicating an absence of liquid medium surrounding and in contact with the surface 30. It will then provide a signal ensuring that the pump 34 is not operated unnecessarily. If, subsequently, the surface 30 is immersed in liquid, more of the diffuse light will be reflected through, rather than internally reflected at, the surface 30 and the unit 35 will recognise the falling of the level of received light below the threshold limit, and will provide a signal causing the pump 34 to be operated, so that the liquid will be sucked up through the lumen 15.

We claim:

1. An optical sensor comprising an elongate probe; a light guide extending from a light source, along the probe towards a tip of the probe and back along the probe to a photodetector, the light guide including, adjacent to the tip, a rigid element, which has a radially outer substantially cylindrical surface providing substantially total internal reflection of light passing circumferentially around the probe within the element, or loss of light, depending on the optical properties of a surrounding medium, and which is mounted in a substantially cylindrical portion of the probe so that the outer surface of the element is substantially flush with the outer surface of that portion of the probe.

2. A sensor according to claim 1, in which the element is substantially annular and is closely received in a groove in the probe.

3. A sensor according to claim 2, in which the element is mounted between two parts of the probe which are connected by a spigot and socket coupling, the element surrounding the spigot.

4. A sensor according to claim 1, in which the light guide includes optical fibres for transmitting light into and out of the element, ends of the fibres abutting optical coupling surfaces of the element facing axially away from the probe tip.

5. A sensor according to claim 4, in which the optical fibres extend down the probe protected in their own duct or ducts within the probe.

6. A sensor according to claim 4, in which the surface of the element facing the probe tip is provided with indented chamfered reflection surfaces in alignment with the coupling surfaces to reflect light from one optical fibre, circumferentially around the element, and to reflect light passing circumferentially around the element into the other optical fibre.

7. A sensor according to claim 1, in which the geometry of the element is such that, in use, light will be transmitted around within the element with potential total internal reflection of central rays at an integral number of nodes on the radially outer surface of the element.

8. A sensor according to claim 6, in which areas of reflectivity are provided on the radially outer surface of the element at the nodes so that the central rays are always internally reflected at these positions.

9. A liquid sucker having a tubular body providing the probe of a sensor according to claim 1, and means for processing the signal received by the detector automatically to switch on a pump or other source of suction to the sucker when the radially outer surface of the element is wetted by a liquid, and to switch off the source when the outer surface is not wetted.

10. A sensor according to claim 2, in which the light guide includes optical fibres for transmitting light into and out of the element, ends of the fibres abutting optical coupling surfaces of the element facing axially away from the probe tip.

11. A sensor according to claim 3, in which the light guide includes optical fibre for transmitting light into and out of the element, ends of the fibres abutting optical coupling surfaces of the element facing axially away from the probe tip.

12. A sensor according to claim 11, in which the optical fibres extend down the probe protected in their own duct or ducts within the probe.

13. A sensor according to claim 10, in which the optical fibres extend down the probe protected in their own duct or ducts within the probe.

14. A sensor according to claim 10, in which the surface of the element facing the probe tip is provided with indented chamfered reflection surfaces in alignment with the coupling surfaces to reflect light from one optical fibre, circumferentially around the element, and to reflect light passing circumferentially around the element into the other optical fibre.

15. A sensor according to claim 11, in which the surface of the element facing the probe tip is provided with indented chamfered reflection surfaces in alignment with the coupling surfaces to reflect light from one optical fibre, circumferentially around the element, and to reflect light passing circumferentially around the element into the other optical fibre.

16. A sensor according to claim 12, in which the surface of the element facing the probe tip is provided with indented chamfered reflection surfaces in alignment with the coupling surfaces to reflect light from one optical fibre, circumferentially around the element, and to reflect light passing circumferentially around the element into the other optical fibre.

17. A sensor according to claim 13, in which the surface of the element facing the probe tip is provided with indented chamfered reflection surfaces in alignment with the coupling surfaces to reflect light from one optical fibre, circumferentially around the element, and to reflect light passing circumferentially around the element into the other optical fibre.

18. A sensor according to claim 2, in which the geometry of the element is such that, in use, light will be transmitted around the element with potential total internal reflection of central rays at an integral number of nodes on the radially outer surface of the element.

19. A sensor according to claim 3, in which the geometry of the element is such that, in use, light will be transmitted around within the element with potential total internal reflection of central rays at an integral number of nodes on the radially outer surface of the element.

20. A sensor according to claim 4, in which the geometry of the element is such that, in use, light will be transmitted around within the element with potential total internal refection of central rays at an integral number of nodes on the radially outer surface of the element.

21. A sensor according to claim 5, in which the geometry of the element is such that, in use, light will be transmitted around within the element with potential total internal reflection of central rays at an integral number of nodes on the radially outer surface of the element.

22. A sensor according to claim 6, in which the geometry of the element is such that, in use, light will be transmitted around within the element with potential total internal reflection of central rays at an integral number of nodes on the radially outer surface of the element.

23. A liquid sucker having a tubular body providing the probe of a sensor according to claim 2, and means for processing the signal received by the detector automatically to switch on a pump or other source of suction to the sucker when the radially outer surface of the element is wetted by a liquid, and to switch off the source when the outer surface is not wetted.

24. A liquid sucker having a tubular body providing the probe of a sensor according to claim 3, and means for processing the signal received by the detector automatically to switch on a pump or other source of suction to the sucker when the radially outer surface of the element is wetted by a liquid, and to switch off the source when the outer surface is not wetted.

25. A liquid sucker having a tubular body providing the probe of a sensor according to claim 4, and means for processing the signal received by the detector automatically to switch on a pump or other source of suction to the sucker when the radially outer surface of the element is wetted by a liquid, and to switch off the source when the outer surface is not wetted.

26. A liquid sucker having a tubular body providing the probe of a sensor according to claim 15, and means for processing the signal received by the detector automatically to switch on a pump or other source of suction to the sucker when the radially outer surface of the element is wetted by a liquid, and to switch off the source when the outer surface is not wetted.

27. A liquid sucker having a tubular body providing the probe of a sensor according to claim 6, and means for processing the signal received by the detector automatically to switch on a pump or other source of suction to the sucker when the radially outer surface of the element is wetted by a liquid, and to switch off the source when the outer surface is not wetted.

28. A liquid sucker having a tubular body providing the probe of a sensor according to claim 7, and means for processing the signal received by the detector automatically to stitch on a pump or other source of suction to the sucker when the radially outer surface of the element is wetted by a liquid, and to switch off the source when the outer surface is not wetted.

29. A liquid sucker having a tubular body providing the probe of a sensor according to claim 8, and means for processing the signal received by the detector automatically to switch on a pump or other source of suction to the sucker when the radially outer surface of the element is wetted by a liquid, and to switch off the source when the outer surface is not wetted.

* * * * *